US007613326B2

(12) United States Patent
Unwin

(10) Patent No.: US 7,613,326 B2
(45) Date of Patent: Nov. 3, 2009

(54) METHOD AND APPARATUS FOR DISCRIMINATING THE COLOUR OF ROAD MARKINGS

(75) Inventor: Jonathan James Unwin, Birmingham (GB)

(73) Assignee: TRW Limited (GB)

( * ) Notice: Subject to any disclaimer, the term of this patent is extended or adjusted under 35 U.S.C. 154(b) by 477 days.

(21) Appl. No.: 10/982,171

(22) Filed: Nov. 5, 2004

(65) Prior Publication Data

US 2005/0129279 A1 Jun. 16, 2005

(30) Foreign Application Priority Data

Nov. 7, 2003 (GB) ................... 0325990.0

(51) Int. Cl.
*G06K 9/00* (2006.01)
(52) U.S. Cl. .................... 382/104; 382/8; 364/424
(58) Field of Classification Search .......... 382/100–154
See application file for complete search history.

(56) References Cited

U.S. PATENT DOCUMENTS

| 4,759,072 | A | * | 7/1988 | Yamane et al. ............. 382/152 |
| 5,790,403 | A | * | 8/1998 | Nakayama .................. 701/28 |
| 6,038,496 | A | * | 3/2000 | Dobler et al. ................ 701/3 |
| 6,091,833 | A | * | 7/2000 | Yasui et al. ................ 382/104 |
| 6,493,614 | B1 | | 12/2002 | Jung |
| 6,591,000 | B1 | | 7/2003 | Oike et al. ................... 382/104 |
| 7,058,206 | B1 | * | 6/2006 | Janssen et al. ............. 382/104 |
| 2004/0105579 | A1 | * | 6/2004 | Ishii et al. .................. 382/154 |

FOREIGN PATENT DOCUMENTS

| EP | 0409642 A2 | 1/1991 |
| EP | 0697641 A2 | 2/1996 |
| JP | 60157611 A | 8/1958 |
| JP | 2002-123819 | 4/2002 |

OTHER PUBLICATIONS

European Search Report dated Jul. 15, 2005 in Application No. EP 04 25 6766.

* cited by examiner

*Primary Examiner*—Samir A. Ahmed
*Assistant Examiner*—Tsung-Yin Tsai
(74) *Attorney, Agent, or Firm*—MacMillan, Sobanski & Todd, LLC

(57) ABSTRACT

A method of discriminating between road markings of at least two colors, comprises: capturing an image of a road and at least one road marking with a monochrome camera having a first color response in a first area of a field of view of the camera and a second color response in the second area of the field of view; and determining the change in intensity of the captured image of the road marking between the first and second areas. Apparatus for discriminating between road markings is also disclosed.

20 Claims, 3 Drawing Sheets

METHOD AND APPARATUS FOR DISCRIMINATING THE COLOUR OF ROAD MARKINGS

CROSS REFERENCE TO RELATED APPLICATION

This application claims priority to United Kingdom Application No. 0325990.0 filed Nov. 7, 2003, the disclosures of which are incorporated herein by reference.

BACKGROUND OF THE INVENTION

This invention relates to a method of and apparatus for discriminating the colour of road markings, especially but not exclusively in the field of lane departure warning systems.

Lane Departure Warning (LDW) and other automotive guidance systems use optical cameras to view the road markings ahead. For economy, it is common practice to use a black and white (monochrome) camera.

In some countries, road works or other diversion lanes are marked in coloured paint and the original (generally white) lines are not deleted. Black and white LDW systems may find it hard to discriminate between the two. Distinguishing between white and other colour lines by using absolute intensity is susceptible to local changes in ambient light (such as shadows) and faded paint. It is therefore desirable to be able to detect the difference between different coloured road markings. Herein, "determining" should be read to include distinguishing between two or more different possible colours for a road marking.

SUMMARY OF THE INVENTION

According to a first aspect of the invention, we provide a method of discriminating between road markings of at least two colours, comprising:

capturing an image of a road and at least one road marking with a monochrome camera having a first colour response in a first area of a field of view of the camera and a second colour response in a second area of the field of view; and determining the change in intensity of the captured image of the road marking between the first and second areas.

By first and second colour responses, we may mean that the camera is more or less sensitive to one or more colours in the first area with respect to the second area.

This method therefore provides a simple method of discriminating the colour of a road marking without requiring the use of a colour camera.

By monochrome, we mean that the camera is a black and white camera in that it is capable of measuring the intensity but not the hue of an image. The camera may be fitted to a vehicle, and the method may be adapted to determine the colour of a road marking from a vehicle.

The method may also detect the edge of the road. The edge of a road may be recognised by a change in intensity due to the change of material from a road surface (for example, asphalt) to that surrounding the road (for example, mud or grass). The difference in colour response may provide more information as to the position of the edge of the road than intensity alone, especially when the difference in intensity over the edge is low.

The step of determining the change in intensity of the captured image may comprise the step of comparing the intensity of the portions in the first and second areas and discriminating between the two colours according to the contrast in intensity between the two areas.

The step of capturing the image may comprise viewing the image through filter means, wherein sections of the filter means of different absorbance spectra provide the different colour response of the first and second areas. At least one of the sections may be coloured, and may be close to or the same as one of the colours of road markings to be discriminated.

From the change in intensity, it may be determined whether the road marking is of similar colour to the coloured section or is of a different colour. A marking may be determined to be of similar colour to the coloured section if the change between the two sections is less than a certain limit, which may be an absolute (that is, the measured intensity changes by a given amount) or a relative (that is, the measured intensity changes by a given ratio) limit.

The markings may be lane boundaries marked on the road. In a preferred embodiment, the coloured section is yellow.

The method may further include providing the marking colour determination to an automotive guidance system. By automotive guidance system, we may include lane departure warning systems, automatic cruise control systems and the like.

The method may further include the step of discriminating between further colours of road marking by providing the camera with at least one further area in the field of view, each of which having a colour response different to the first and second areas. In the case where filter means are provided, the filter means may be provided with at least one further coloured section, which may be a different colour to the coloured section and any other further coloured sections. This enables the method to discriminate, between a plurality of colours, the colour of different colour road markings from measured changes in intensity of the image of the road between the first, second and further areas. The coloured section may be yellow and there may be provided red and blue further coloured sections.

According to the second aspect of the invention, there is provided an apparatus arranged to be fitted to a vehicle and capable of discriminating between at least a first colour and a second colour of road markings, comprising:

a monochrome camera arranged to view the road ahead of the vehicle, and a processing unit, arranged to capture images from the camera and determine from the captured images the position of road markings;

in which the camera has a first colour response in a first area of a field of view of the camera and a second colour response in a second area of the field of view; and in which the processing unit is arrange to discriminate between the first and second colour of the road markings from the change in intensity of the captured image of the road markings between first and second areas.

By first and second colour responses, we may mean that the camera is more or less sensitive to one or more colours in the first area with respect to the second area.

This provides an apparatus that can distinguish between different colour road markings whilst still being able to use a black and white (monochrome) camera.

The apparatus may also be arranged to detect the edge of the road. The edge of a road may be recognised by a change in intensity due to the change of material from a road surface (for example, asphalt) to that surrounding the road (for example, mud or grass). The difference in colour response may provide more information as to the position of the edge of the road than intensity alone, especially when the difference in intensity over the edge is low.

The camera may be provided with filter means wherein sections of the filter means of different absorbance spectra provide the different colour response of the first and second areas. At least one of the sections may be coloured, and may be close to or the same as one of the colours of road markings to be discriminated.

The filter means may be of the form of a background (which may be uncoloured), preferably having a band of colour forming the coloured area. The band may be straight, and may be horizontal. This is advantageous, as most road markings will appear substantially vertical to a vehicle-mounted camera.

The filter means may be a filter, which may comprise a single filter component. Alternatively, the filter may comprise a plurality of filter components.

The camera may have a lens, and the filter means may be provided between the lens and the image to be captured. Alternatively, the filter may be provided between the lens and a sensor element. The coloured section of the filter means may cover an area greater than one adjacent pixel in the image as captured. Indeed, it may cover an area greater than 10 or 100 pixels in the image as captured. The filter means may cover a majority of the field of view.

In a preferred embodiment, the coloured area is yellow.

The camera may be provided with at least one further area in the field of view, each of which having a colour response different to the first and second areas. In the case where filter means are provided, a plurality of coloured areas may be provided, which may each have at least one boundary in the field of view of the camera. The coloured sections may be of different colours to one another. The processing unit may be adapted to determine the colour of the road markings from the change in intensity of the captured image of the road markings over the, or each, boundary. There may be coloured sections coloured yellow, red and blue.

The apparatus may form part of an automotive guidance system, such as a lane departure warning system or an automatic cruise control system.

The apparatus may be arranged to carry out the method of the first aspect of the invention.

According to a third aspect of the invention, there is provided a vehicle fitted with the apparatus of the second aspect of the invention.

Other advantages of this invention will become apparent to those skilled in the art from the following detailed description of the preferred embodiment, when read in light of the accompanying drawings.

DETAILED DESCRIPTION OF THE INVENTION

Figure 1:
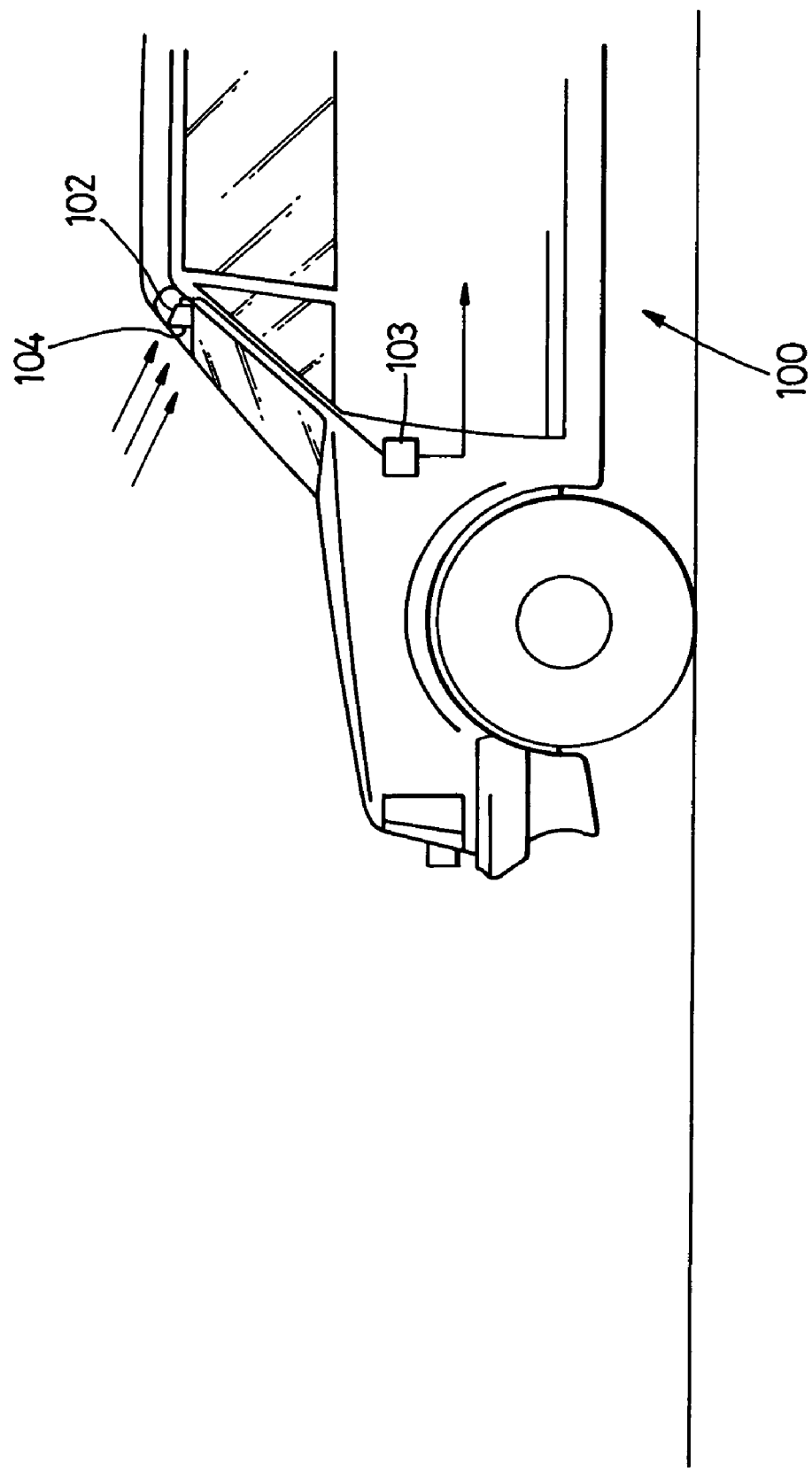
FIG. 1 shows a vehicle fitted with a lane departure warning sensor according to the present invention.

The vehicle 100 depicted in FIG. 1 of the accompanying drawings has been fitted with a lane departure warning system. This comprises a monochrome video camera 102 connected to a processing unit 103, which is arranged to capture images from the video camera 102. The processing unit then analyses the images to determine the position of the lanes as is known in the prior art, such as in PCT publication number WO 03/087724 published 23 Oct. 2003, and to give a user of the vehicle an indication of when they are leaving a marked lane.

Figure 2:
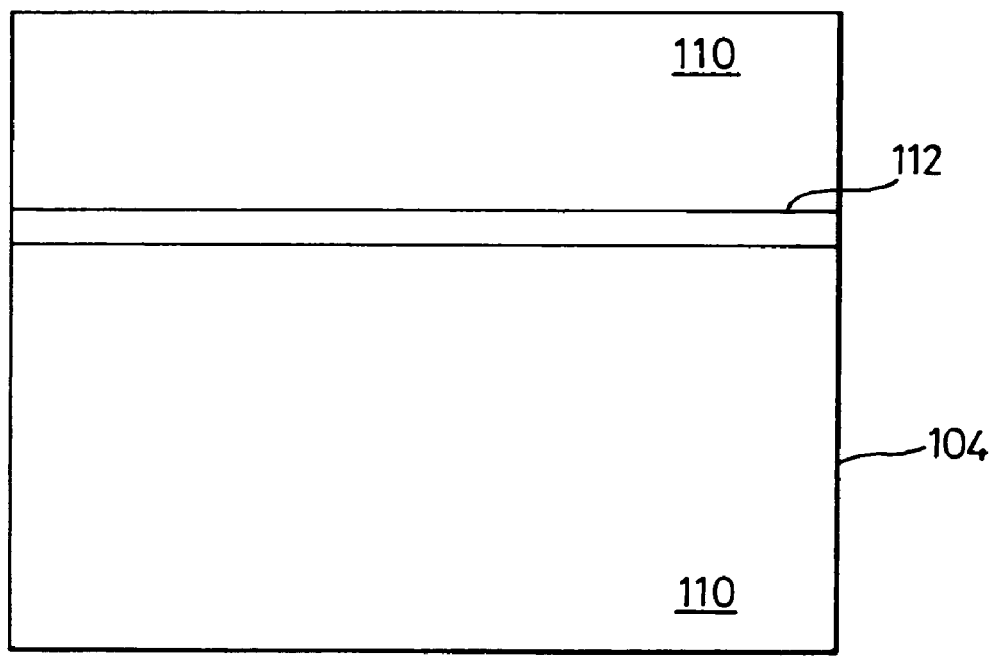
FIG. 2 shows a first embodiment of the filter used in the present invention.

In order that the monochrome video camera 102 is able to distinguish between white and yellow lane markings, the camera 102 is fitted with a filter 104, which is depicted in more detail in FIG. 2 of the accompanying drawings. This comprises a generally clear background 110 overlaid with a horizontal yellow filter section 112.

Figure 3:
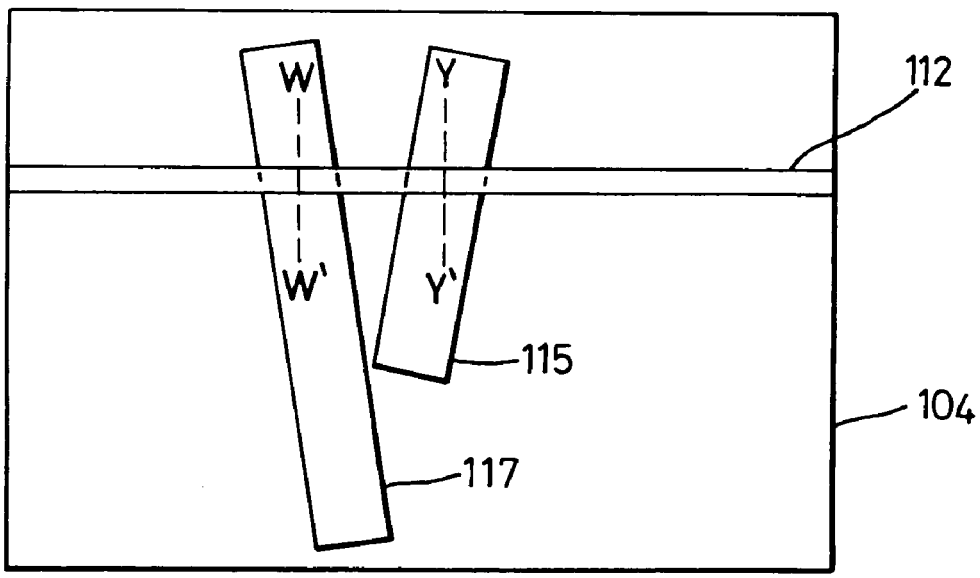
FIG. 3 shows a view of lane markings as captured through the filter of FIG. 2.

Accordingly, when the processing unit 103 captures images of lanes, such as the exemplary image of FIG. 3 of the accompanying drawings, the processing unit 103 may be able to determine whether the lane markings are yellow or white by comparing the measured intensity of the captured image of the relevant lane marking at either side of the yellow filter section 112 and within the yellow filter section 112. This can be determined by measuring the intensity along each detected lane marking as it crosses the yellow filter section 112. This can be seen in more detail in FIGS. 4a and 4b of the accompanying drawings.

Figure 4A:
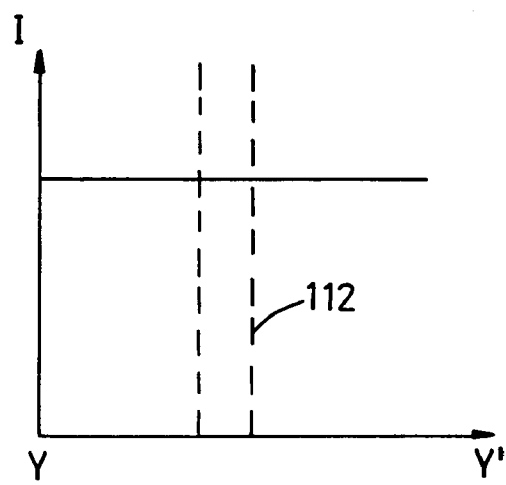
FIGS. 4a and 4b show the measured intensities along lines Y-Y' and W-W' of FIG. 3, respectively.
Figure 4B:
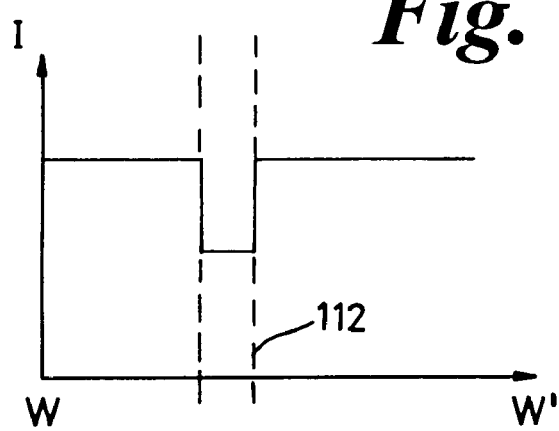

FIGS. 4a and 4b of the accompanying drawings show the measured intensity along the two lane markings 115 and 117 depicted in FIG. 3 of the accompanying drawings. FIG. 4a depicts the measured intensity along line Y-Y' along yellow line 115, and FIG. 4b depicts the measured intensity along line W-W' along white line 117. As can be seen in FIG. 4a, the intensity measured within the yellow filter section 112 is the same as measured in the clear background 110 and as such the intensity does not greatly change, indicating a yellow lane marking 115. However, FIG. 4b shows the effect that the yellow filter section 112 has on white line 117. A significant drop in measured intensity occurs over the yellow filter area 112, thereby indicating the presence of a white lane marking 115.

From the difference in intensities within and without the yellow filter section 112, the processing unit 103 can determine whether the lane markings are white or yellow. In a preferred embodiment, the processing unit determines that the lane marking is yellow if the difference in the measured intensities is less than a predetermined ratio.

The processing unit can then act on its determination. For example, yellow lane markings may take precedence over white lane markings, such that the lane departure warning system preferentially follows yellow lane markings rather than white lane markings. Alternatively, the system may simply display which lane markings are which to the user.

Figure 5:
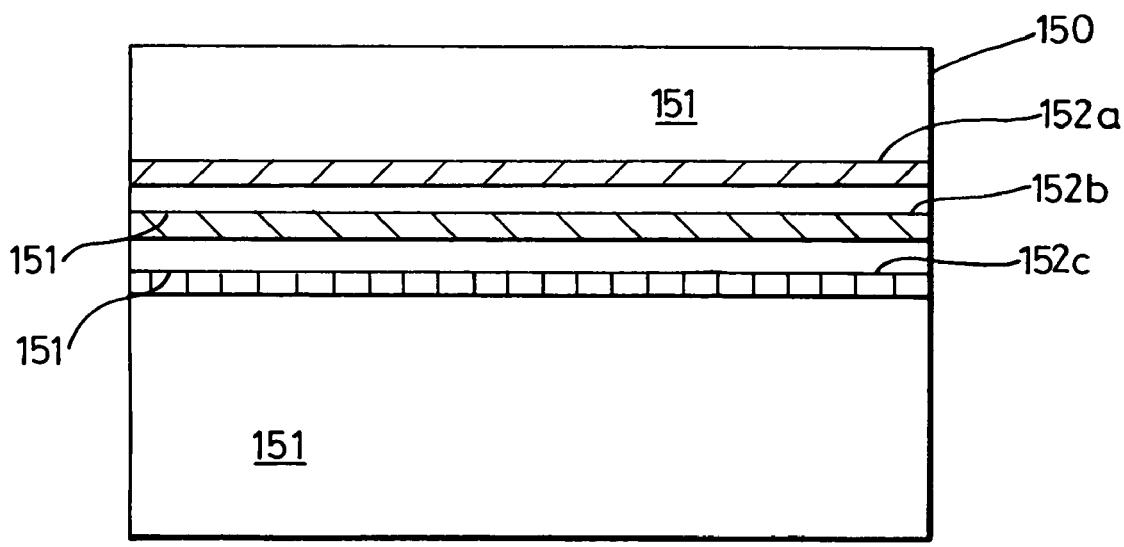
FIG. 5 shows an alternate embodiment of the filter used in the present invention.

It is appreciated that different territories, states and countries may have different coloured lane markings. In an alternative embodiment, the filter 104 above is replaced with the alternative filter 150 shown in FIG. 5 of the accompanying drawings. A clear background 151 is provided as before, but in this embodiment a plurality (in this case, three) different colour filter sections 152a, 152b, 152c are provided each separated by an area of clear background 151. Any number of colour filter sections may be provided, the colour of each corresponding with a lane marking which it is desired to differentiate from other, generally white, lane markings. In the present embodiment, colour filter section 152a may be yellow, colour filter section 152b may be blue and colour filter section 152c may be red.

In the same way as in the first embodiment, the changes in intensity along each detected lane marking over the different colour filter sections 152 may be determined. A small change in intensity (typically measured as a ratio) over a given colour filter section 152 implies that the lane marking is of that colour, whilst significant changes in intensity over any of the colour filter sections 152 imply a white marking.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of discriminating between road markings of at least two colours, comprising the steps of:
   (a) providing a monochrome camera for viewing road markings through a filter positioned between said road markings and said camera, said filter extending generally transversely to the road markings and having at least two sections, the filter sections providing a first colour response in a first area of a field of view of said camera and a second colour response in a second area of said field of view of said camera;
   (b) capturing an image of at least one road marking with the monochrome camera provided in step (a), said captured road marking image extending generally along the length of the road marking from said first area of said camera field of view into said second area of said camera field of view;
   (c) determining a change in intensity of said captured image of said road marking between said first and second areas in said field of view; and
   (d) utilizing the change in intensity of said captured road marking image to discriminate between at least two colours.

2. The method of claim 1 wherein step (d) includes the substeps of:
   (d1) comparing the intensity of said captured image in said first and second areas and further wherein step (d) includes
   (d2) discriminating between said at least two colours according to the contrast in intensity between said first and second areas.

3. The method of claim 1 wherein said camera is adapted to be fitted to a vehicle and further wherein the method determines the colour of a road marking from said vehicle.

4. The method of claim 1 wherein at least one of said sections of said filter is coloured, and further wherein the method determines from said change in intensity whether said road marking is one of a similar colour to said coloured section and a different colour from said coloured section.

5. The method of claim 1 wherein the markings are lane boundaries marked on a road.

6. The method of claim 1, further including, subsequent to step (d), determining a road marking colour from measured changes in intensity of the image of said road marking between said first and second areas of said field of view and then providing said road marking colour determination to an automotive guidance system.

7. The method of claim 1, further including a step of discriminating between further colours of road marking by providing said camera with at least one further area in said field of view, said at least one further area having a colour response different from said colour responses of said first and second areas.

8. The method of claim 7 wherein the method discriminates said colour of said different colour road markings from measured changes in intensity of the image of the road marking between the first, second and further areas.

9. The method of claim 1, which further detects an edge of a road.

10. The method of claim 1 wherein said filter sections have different absorbance spectra.

11. An apparatus adapted to be fitted to a vehicle and capable of discriminating between at least a first colour and a second colour of road markings, the apparatus comprising:
    a monochrome camera arranged to view a road marking ahead of said vehicle, said camera being provided with a filter positioned between said road markings and said camera, said filter having at least two sections, said filter extending generally transversely across said road marking, said filter sections providing said different colour response of said first and second areas and having a first colour response in a first area of a field of view of said camera and a second colour response in a second area of said field of view of said camera; and
    a processing unit, arranged to capture images from said camera that are generally along the length of said road marking and determine from said capture images a position of said road markings with said road markings extending from said first area of said camera field of view into said second area of said camera field of view said processing unit also being arranged to discriminate between said first and second colours of said road markings from a change in intensity of said captured image of said road markings between said first and second areas in said field of view.

12. The apparatus of claim 11 wherein at least one of said filter sections is coloured, said coloured filter section being one of close to and the same as one of said colours of road markings to be discriminated.

13. The apparatus of claim 12 wherein said filter is of the form of a background having a band of colour forming said coloured area.

14. The apparatus of claim 13 wherein said band of colour is straight and generally parallel to a road surface.

15. The apparatus of claim 11 wherein said camera has a lens, and said filter is provided between said lens and said image to be captured.

16. The apparatus of claim 11 wherein said filter covers a majority of said field of view.

17. The apparatus of claim 11 wherein said monochrome camera is provided with at least one further area in said field of view, said at least one further area having a colour response different from said colour responses of said first and second areas.

18. The apparatus of claim 11 wherein said monochrome camera is arranged to detect an edge of a road.

19. The apparatus of claim 11 wherein said monochrome camera is included in an automotive guidance system.

20. An apparatus capable of discriminating between at least a first colour and a second colour of road markings, the apparatus comprising:
    a vehicle;
    a monochrome camera mounted upon said vehicle, said monochrome camera arranged to view road markings ahead of said vehicle, said camera viewing said road markings through a filter positioned between said road markings and said camera, said filter extending generally transversely to the road markings and having at least two sections, the filter sections providing a first colour response in a first area of a field of view of said camera and a second colour response in a second area of said field of view of said camera; and a processing unit, arranged to capture images from said camera and to determine from said captured images a position of said road markings with said road markings generally along the length of said road markings and extending from said first area of said camera field of view into said second area of said camera field of view, said processing unit also being arranged to discriminate between said first and second colours of said road markings from a change in intensity of said captured image of said road markings between said first and second areas in said field of view.

* * * * *

UNITED STATES PATENT AND TRADEMARK OFFICE
CERTIFICATE OF CORRECTION

PATENT NO. : 7,613,326 B2
APPLICATION NO. : 10/982171
DATED : November 3, 2009
INVENTOR(S) : Jonathan James Unwin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 738 days.

Signed and Sealed this

Nineteenth Day of October, 2010

David J. Kappos
*Director of the United States Patent and Trademark Office*